(12) United States Patent
Ogishi et al.

(10) Patent No.: US 9,696,889 B2
(45) Date of Patent: Jul. 4, 2017

(54) ELECTRONIC DEVICE THAT DISPLAYS AN OPERATION SCREEN INCLUDING AN OBJECT

(71) Applicant: KYOCERA Document Solutions Inc., Osaka (JP)

(72) Inventors: Ryosuke Ogishi, Osaka (JP); Tsuyoshi Nitta, Osaka (JP); Minoru Takahashi, Osaka (JP); Masato Tanba, Osaka (JP)

(73) Assignee: KYOCERA Document Solutions Inc. (JP)

( * ) Notice: Subject to any disclaimer, the term of this patent is extended or adjusted under 35 U.S.C. 154(b) by 325 days.

(21) Appl. No.: 14/601,424

(22) Filed: Jan. 21, 2015

(65) Prior Publication Data

US 2015/0212720 A1 Jul. 30, 2015

(30) Foreign Application Priority Data

Jan. 30, 2014 (JP) ................................ 2014-015440

(51) Int. Cl.
*G06F 15/00* (2006.01)
*G06F 13/00* (2006.01)
*G06F 3/0484* (2013.01)
*G06F 3/01* (2006.01)
*G06F 3/0483* (2013.01)

(52) U.S. Cl.
CPC .......... *G06F 3/04842* (2013.01); *G06F 3/013* (2013.01); *G06F 3/0483* (2013.01)

(58) Field of Classification Search
CPC ................................ G06F 3/005; G06T 15/08
USPC ........ 715/763–765, 740–745, 851–854, 810, 715/771
See application file for complete search history.

(56) References Cited

U.S. PATENT DOCUMENTS 9,342,921 B2 * 5/2016 Konami .................. G06T 15/08
2014/0285404 A1 * 9/2014 Takano ................... G06F 3/005
345/8

FOREIGN PATENT DOCUMENTS

JP 2011-243108 A 12/2011

* cited by examiner

*Primary Examiner* — Kevin Nguyen
(74) *Attorney, Agent, or Firm* — McDonnell Boehnen Hulbert & Berghoff LLP

(57) ABSTRACT

Provided is an electronic device, including: a display unit that displays, on one screen, a plurality of objects to be selected by a user; a line-of-sight detection unit that detects visually-recognized coordinates on the display unit to which the user's line-of-sight is directed; an object visually-recognized time period calculation unit that calculates a time period during which the visually-recognized coordinates detected by the line-of-sight detection unit fall within a range of the object; and a selection exclusion unit that excludes the object from candidates to be selected by the user if the time period calculated by the object visually-recognized time period calculation unit is longer than a time period threshold value and a frequency at which the object is selected is higher than a frequency threshold value.

19 Claims, 6 Drawing Sheets

ELECTRONIC DEVICE THAT DISPLAYS AN OPERATION SCREEN INCLUDING AN OBJECT

REFERENCE TO RELATED APPLICATIONS

This application is based upon and claims the benefit of priority from the corresponding Japanese Patent Application No. 2014-015440, filed in the Japan Patent Office on Jan. 30, 2014, the entire contents of which are incorporated herein by reference.

FIELD

The present disclosure relates to an electronic device having a function of displaying an operation screen including an object.

BACKGROUND

A typical electronic device provides a graphical user interface (GUI) to a user. The user is allowed to select a function by selecting an object, such as an icon, displayed on a display unit by using a button or the like on an operation panel unit. The object typically corresponds to a function to be selected.

The user can easily select an object corresponding to an often-used function by remembering the function from an image of the object displayed on the screen of the operation panel unit.

Here, the typical electronic device identifies a position of the user's line-of-sight directed to the display unit, and displays a cursor indicating the position of the user's line-of-sight on the display unit when it is detected by a line-of-sight position identification unit that the position of the user's line-of-sight is directed to a specific area within the display unit. The typical electronic device then executes an operation corresponding to an icon in a state in which the cursor has selected the icon.

SUMMARY

An electronic device according to one embodiment of the present disclosure includes a display unit, a line-of-sight detection unit, an object visually-recognized time period calculation unit, and a selection exclusion unit. The display unit displays, on one screen, a plurality of objects to be selected by a user. The line-of-sight detection unit detects visually-recognized coordinates on the display unit to which the user's line-of-sight is directed. The object visually-recognized time period calculation unit calculates a time period during which the visually-recognized coordinates detected by the line-of-sight detection unit fall within a range of the object. The selection exclusion unit excludes the object from candidates to be selected by the user if the time period calculated by the object visually-recognized time period calculation unit is longer than a time period threshold value and a frequency at which the object is selected is higher than a frequency threshold value.

An operation screen display method according to one embodiment of the present disclosure includes: (i) displaying, via a display unit, on one screen, a plurality of objects to be selected by a user; (ii) detecting, via a line-of-sight detection unit, visually-recognized coordinates on the display unit to which the user's line-of-sight is directed; (iii) calculating, via an object visually-recognized time period calculation unit, a time period during which the visually-recognized coordinates detected by the line-of-sight detection unit fall within a range of the object; and (iv) excluding, via a selection exclusion unit, the object from candidates to be selected by the user if the time period calculated by the object visually-recognized time period calculation unit is longer than a time period threshold value and a frequency at which the object is selected is higher than a frequency threshold value.

A non-transitory computer-readable recording medium according to one embodiment of the present disclosure has recorded thereon an operation screen display program executable by a computer. The operation screen display program includes first to fourth program codes. The first program code causes the computer to display, on one screen of a display unit, a plurality of objects to be selected by a user. The second program code causes the computer to detect visually-recognized coordinates on the display unit to which the user's line-of-sight is directed. The third program code causes the computer to calculate a time period during which the visually-recognized coordinates detected by the second program code fall within a range of the object. The fourth program code causes the computer to exclude the object from candidates to be selected by the user if the time period calculated by the third program code is longer than a time period threshold value and a frequency at which the object is selected is higher than a frequency threshold value.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Figure 1:
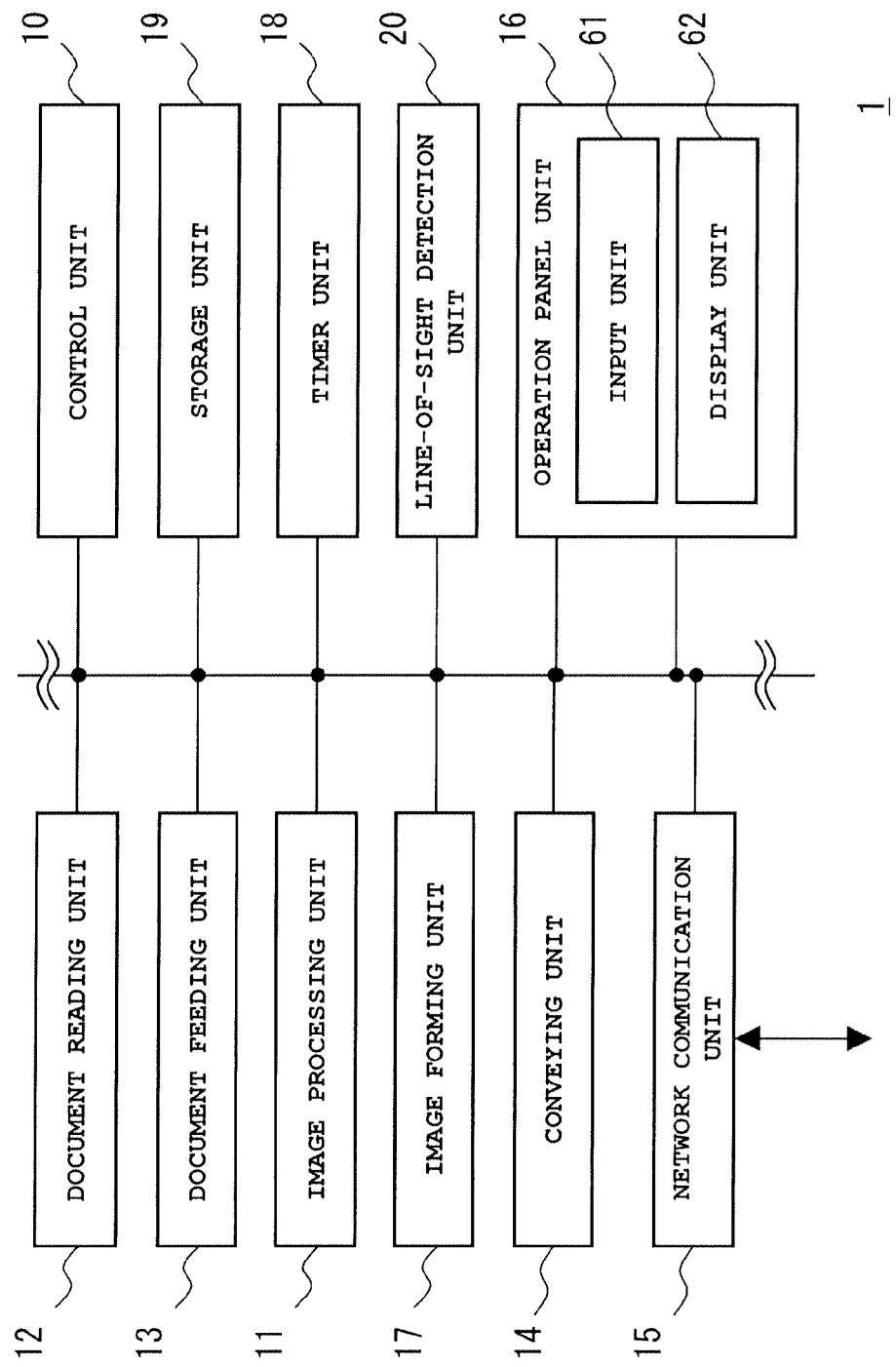
FIG. 1 illustrates an overall configuration of an image forming apparatus according to an embodiment of the present disclosure.

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

First, an overall configuration of an image forming apparatus 1 is described with reference to FIG. 1. The image forming apparatus is an example of an electronic device according to an embodiment of the present disclosure.

The image forming apparatus 1 includes an image processing unit 11, a document reading unit 12, a document feeding unit 13, a conveying unit 14, a network communication unit 15, an operation panel unit 16, an image forming unit 17, a timer unit 18, a storage unit 19, and a line-of-sight detection unit 20, all of which are connected to a control unit 10. An operation of each unit is controlled by the control unit 10.

The control unit 10 is an information processing device such as a general purpose processor (GPP), a central processing unit (CPU), a micro processing unit (MPU), a digital signal processor (DSP), a graphics processing unit (GPU), or an application specific integrated circuit (ASIC).

The control unit 10 reads a control program stored in a ROM or an HDD of the storage unit 19, and expands the control program into a RAM for execution thereof, to thereby be able to operate as each unit of functional block described later. Further, the control unit 10 controls the entire apparatus in accordance with instruction information input from an external terminal or the operation panel unit 16.

The image processing unit 11 is a control computing device such as a digital signal processor (DSP) or a graphics processing unit (GPU). The image processing unit 11 subjects image data to, for example, different kinds of image processing for enlargement/reduction, density adjustment, grayscale adjustment, image improvement, or the like.

The image processing unit 11 stores an image read by the document reading unit 12 in the storage unit 19 as print data. In this case, the image processing unit 11 can also convert the print data in units of files having a format such as PDF or TIFF.

The document reading unit 12 is a scanner that reads a document placed therein.

The document feeding unit 13 is a mechanism that conveys the document read by the document reading unit 12.

The conveying unit 14 conveys recording paper from a sheet feeding cassette, forms an image thereon by the image forming unit 17, and then conveys the recording paper to a stack tray.

The network communication unit 15 is a network-connected device including a LAN board, a wireless communication device, or the like for connection to an external network such as a LAN, a wireless LAN, a WAN, or a mobile phone network.

The network communication unit 15 transmits and receives data through a line for data communications, and transmits and receives a speech signal through a speech phone line.

The operation panel unit 16 includes an input unit 61 and a display unit 62.

The input unit 61 is a touch panel, a button, or the like for acquiring various instructions issued by the user.

The touch panel of the input unit 61 uses a capacitive system, a resistive system, an ultrasonic detection system, or the like to detect coordinates pressed by the user on the display unit 62, a force of the pressing, and the like. Note that, when the touch panel of the input unit 61 is compatible with multi-touch, a plurality of coordinates, pressing forces, and the like may be detected. Further, the touch panel of the input unit 61 may be formed integrally with the display unit 62.

A button part of the input unit 61 includes a start key, a numeric keypad, a button for switching among operation modes such as copy, scan, and communication, and buttons for acquiring instructions relating to printing, transmission, reception, and the like of the selected document.

The display unit 62 is a display device such as a flat display panel including a liquid crystal display (LCD), an organic electro-luminescence display (GELD), or a field emission display (FED), a projector, or an LED for displaying a status. The display unit 62 displays various operation screens. The display unit 62 displays, on one screen, a plurality of objects 200 (FIG. 3) to be selected by the user.

The display unit 62 can display various images of the GUI. Here, the various images include data on the objects 200 (FIG. 3) to be selected by the user. Further, the display unit 62 can display a preview image or the like.

In accordance with an output instruction issued by the user, the image forming unit 17 forms an image on the recording paper from data that is stored in the storage unit 19, read by the document reading unit 12, or acquired from an external terminal.

The timer unit 18 is a time acquisition device such as a clock built into a CPU, a real-time clock, a global positioning system (GPS) receiver, and/or an Network Time Protocol (NTP) client. The timer unit 18 can acquire time information corresponding to an actual time, within a very small error.

Further, the timer unit 18 can set a timer that generates an interruption or the like after a set time lapse.

The storage unit 19 is a storage device that uses a semiconductor memory such as a read only memory (ROM) or a random access memory (RAM) or a recording medium such as a hard disk drive (HDD).

The storage unit 19 stores a plurality of pieces of screen selection information 300 (FIG. 3), which indicate a combination of a plurality of objects 200 displayed on one screen.

Further, the ROM or the HDD of the storage unit 19 stores the control program for controlling the operation of the image forming apparatus 1. In addition, the storage unit 19 stores account settings of the user. Further, the storage unit 19 may include an area for a document box of each user or the like.

Figure 2:
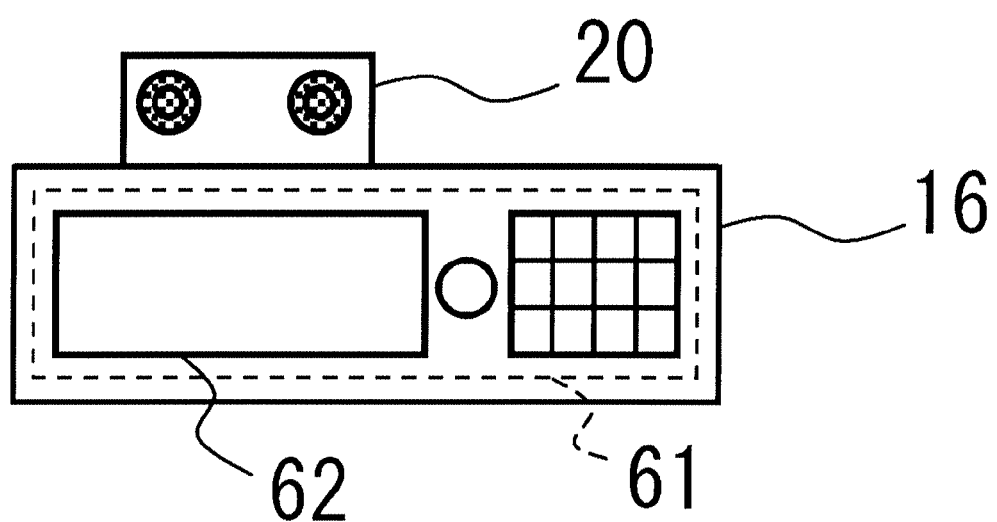
FIG. 2 illustrates an outline of an operation panel unit and a line-of-sight detection unit illustrated in FIG. 1.

The line-of-sight detection unit 20 is a line-of-sight detection device provided with, for example, a plurality of cameras and a DSP. FIG. 2 illustrates an example of an external appearance of the operation panel unit 16 and the line-of-sight detection unit 20 of the image forming apparatus 1.

The line-of-sight detection unit 20 detects visually-recognized coordinates 400 (FIG. 3) on the display unit to which the user's line-of-sight is directed. The line-of-sight detection unit 20 detects, for example, the user's face and eyes from image data on a picked-up image, further calculates the user's line of sight by a three dimensional vector format or the like, and calculates the visually-recognized coordinates 400 that are coordinates of an intersection of the line of sight and the display unit 62.

Further, the line-of-sight detection unit 20 can be installed in the operation panel unit 16. In the example illustrated in FIG. 2, the line-of-sight detection unit 20 is installed at an end portion of the operation panel unit 16, but may be installed on a surface of the operation panel unit 16, or may be incorporated into the operation panel unit 16. Further, the line-of-sight detection unit 20 may be installed in a position spaced apart from the operation panel unit 16. Further, the line-of-sight detection unit 20 may be provided with an illumination part for illuminating the user or the like.

Note that, in the image forming apparatus 1 illustrated in FIG. 1, the control unit 10 and the image processing unit 11 may be integrally formed as in a CPU or the like having a GPU incorporated therein or a chip-on-module package.

Further, the control unit 10 and the image processing unit 11 may incorporate a RAM, a ROM, a flash memory, or the like.

Further, the image forming apparatus 1 may include a fax communication unit that performs facsimile communication.

Figure 3:
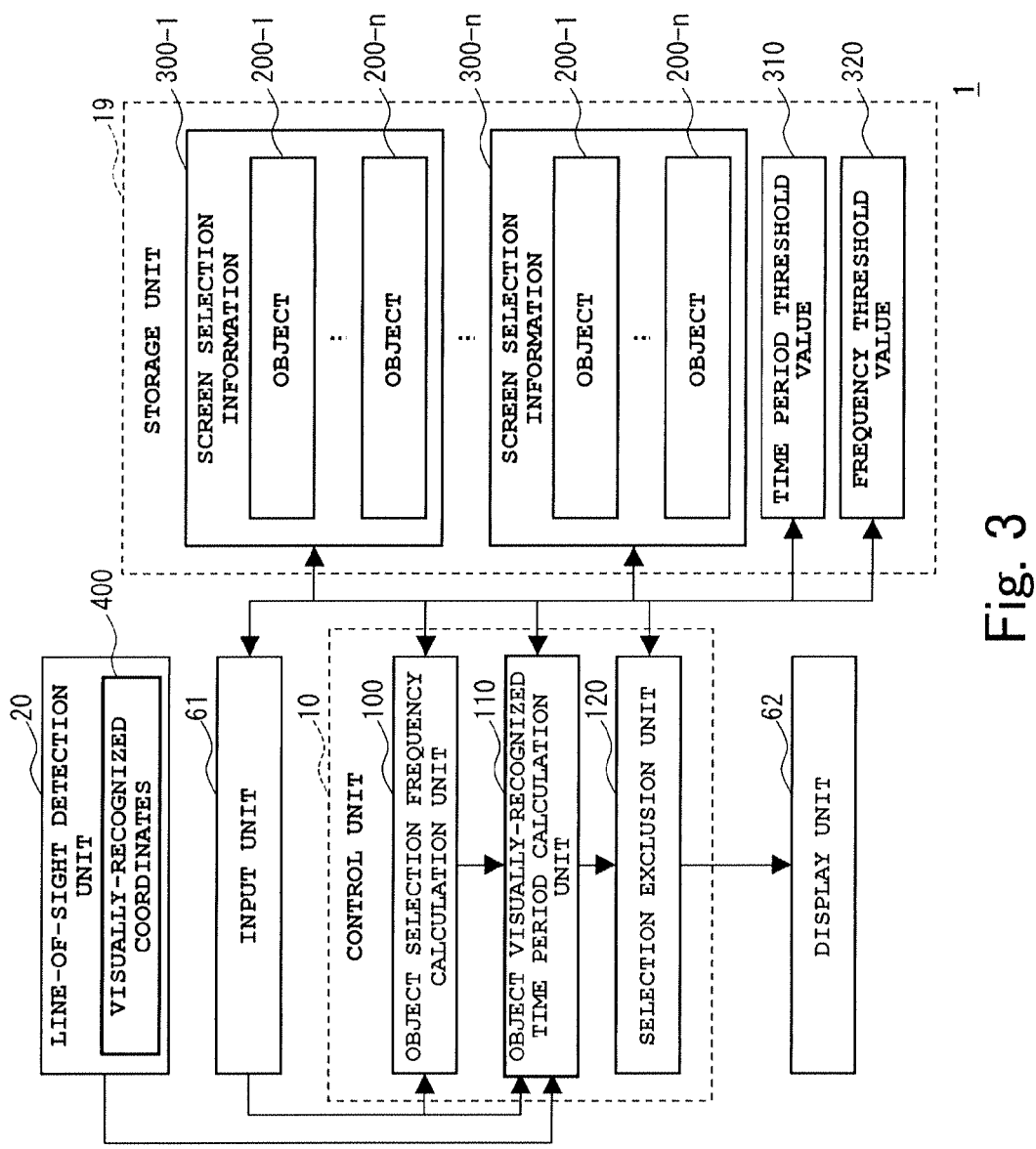
FIG. 3 illustrates a control configuration of the image forming apparatus illustrated in FIG. 1.

Now, a description is made of a control configuration of the image forming apparatus 1 with reference to FIG. 3.

The control unit 10 of the image forming apparatus 1 includes an object selection frequency calculation unit 100, an object visually-recognized time period calculation unit 110, and a selection exclusion unit 120.

The storage unit 19 stores the screen selection information 300 that constitute one form of screen display information, a time period threshold value 310, and a frequency threshold value 320.

Figure 4:
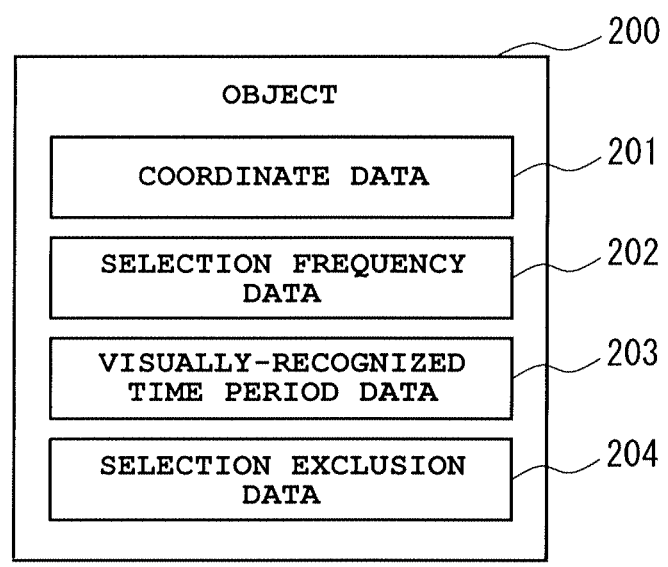
FIG. 4 illustrates a data structure of an object illustrated in FIG. 3.

The object selection frequency calculation unit 100 calculates a frequency at which each object 200 is selected. The object selection frequency calculation unit 100 acquires an object selection completion instruction issued when the user selects objects 200-1 to 200-*n* (hereinafter referred to simply as "object 200" when any one of those objects 200-1 to 200-*n* is referred to) displayed on the screen of the display unit 62 through the touch panel or the button of the input unit 61. When acquiring the object selection completion instruction, the object selection frequency calculation unit 100 calculates the frequency at which each object 200 is selected within a specific period for each piece of the screen selection information 300 corresponding to the displayed screen. The object selection frequency calculation unit 100 stores the frequency at which each object 200 is selected in selection frequency data 202 (FIG. 4).

Note that, the object selection frequency calculation unit 100 may extract a function that is often used from the user's operation history, and may calculate the selection frequency data 202 within the object 200. In this case, the object selection frequency calculation unit 100 may measure the number of times that the user reaches a specific function with ease, and at a time point when it is confirmed that the function has been used a number of times equal to or larger than a fixed number of times, may determine that the object 200 corresponding to the specific function is a frequently-used function, which may be set in the selection frequency data 202 and stored in the storage unit 19.

The object visually-recognized time period calculation unit 110 calculates a time period during which the visually-recognized coordinates 400 detected by the line-of-sight detection unit 20 fall within a range of each object 200. That is, the object visually-recognized time period calculation unit 110 calculates a visually-recognized time period regarding how long the user has viewed which object 200 such as an icon displayed on the screen. If the visually-recognized time period is equal to or longer than the time period threshold value 310 described later, it is highly possible that the user has recognized the function corresponding to the object 200.

Specifically, the object visually-recognized time period calculation unit 110 compares the visually-recognized coordinates 400 with coordinate data 201 (FIG. 4) on each object 200, determines whether or not the visually-recognized coordinates 400 fall within the range of the object 200, and counts and calculates the time period of falling within the range. After that, the object visually-recognized time period calculation unit 110 stores the calculated time period in visually-recognized time period data 203 within the object 200.

If a time period calculated by the object visually-recognized time period calculation unit 110 is longer than the time period threshold value 310 and if a frequency at which the object 200 is selected is higher than the frequency threshold value 320, the selection exclusion unit 120 determines that the user has already recognized the object 200 as being different from a function or the like to be selected, and excludes the object 200 from candidates to be selected by the user (hereinafter referred to as "selection exclusion"). The selection exclusion unit 120 sets and stores selection exclusion data 204 (FIG. 4) indicating that the object 200 is excluded from selection in the above-mentioned manner.

Further, if instructed to display another screen by the user, the selection exclusion unit 120 changes the screen selection information 300 to other screen selection information, and draws each object included in the other screen selection information after the change on the display unit 62. In this case, if the screen selection information 300 is changed to other screen selection information and then returned to the document screen selection information 300, the selection exclusion unit 120 reads the selection exclusion data 204 within each object 200 included in the document screen selection information 300 after the return. If each object 200 corresponding to the selection exclusion data 204 that has been read is excluded by the selection exclusion data 204 from the candidates to be selected by the user, the selection exclusion unit 120 displays the object 200 on the display unit 62 differently from another object 200 that is not excluded. As the distinctive display, for example, the selection exclusion unit 120 grays out the object 200, or inhibits the object 200 from being displayed in the first place.

The screen selection information 300 is data indicating a combination on the screen of a plurality of selectable objects 200 displayed on the display unit 62 (hereinafter referred to simply as "screen selection information 300" when any of the pieces of screen selection information 300-1 to 300-*n* is referred to). The screen selection information 300 is selected so as to correspond to the user's instruction to select the screen to be displayed. Further, the screen selection information 300 may include a plurality of the same or different objects 200-1 to 200-*n*.

Note that, the screen selection information 300 may include information on the object 200 such as a preview image, menu display, or the like that is not selected by the user.

The time period threshold value 310 is a threshold value regarding a time period during which the visually-recognized coordinates 400 calculated by the line-of-sight detection unit 20 fall within a range of each object 200. The time period threshold value 310 is used by the selection exclusion unit 120 to exclude objects 200 from the selection. The time period threshold value 310 may have a time period of approximately several hundred milliseconds to several seconds set as a time period that allows the user to recognize a function or the like corresponding to the object 200. Further, the time period threshold value 310 may be set in accordance with the user's instruction issued through the input unit 61 of the operation panel unit 16.

The frequency threshold value 320 is a threshold value regarding a frequency at which each object 200 is selected by the user within a specific period. The frequency threshold value 320 is also used by the selection exclusion unit 120 to exclude objects 200 from the selection. The frequency threshold value 320 may be set by a frequency at which the user uses a function. Further, the frequency threshold value 320 may be set in accordance with the user's instruction issued through the input unit 61 of the operation panel unit 16. Further, a specific period for calculating the frequency threshold value 320 may be changed at intervals of approximately several days to several months. Note that, the time period threshold value 310 and the frequency threshold value 320 may be set for each user.

The visually-recognized coordinates 400 is data on coordinates on the display unit 62 to which the user's line of sight is directed, which is calculated by the line-of-sight detection unit 20. Note that, the visually-recognized coordinates 400 may be stored temporarily in the storage unit 19.

Next, a description is made of a detailed structure of data on the object 200 with reference to FIG. 4. The object 200 includes the coordinate data 201, the selection frequency data 202, the visually-recognized time period data 203, and the selection exclusion data 204.

The coordinate data 201 is data on the coordinates indicating a range within which the object 200 is displayed on the screen of the display unit 62. The coordinate data 201 may be designated to have a shape of, for example, a polygon, a circle, or an oval.

The selection frequency data 202 is data indicating the frequency at which the object 200 is selected by the user within a specific period.

The visually-recognized time period data 203 is data indicating, for example, a total length of the time period for which the object 200 has been visually recognized by the user since the screen selection information 300 including the object 200 is displayed.

The selection exclusion data 204 is data indicating, for example, whether the object 200 is in a selection exclusion state in which the object 200 has been excluded from the selection or a normal state in which the object 200 has not been excluded from the selection.

Note that, the object 200 may include, for example, image data on the icon to be displayed or text data for descriptions thereof. Further, the object 200 may include, for example, the coordinate data 201, the selection frequency data 202, the visually-recognized time period data 203, and the selection exclusion data 204 that are different for each piece of screen selection information 300.

Here, the control unit 10 of the image forming apparatus 1 executes the control program stored in the storage unit 19, to thereby function as the object selection frequency calculation unit 100, the object visually-recognized time period calculation unit 110, and the selection exclusion unit 120.

Further, each unit of the image forming apparatus 1 described above serves as a hardware resource that executes an image forming method according to the present disclosure.

Next, a description is made of line-of-sight selection assisting processing performed by the image forming apparatus 1 according to the embodiment of the present disclosure with reference to FIG. 5 and FIGS. 6A to 6C.

In the line-of-sight selection assisting processing according to this embodiment, if the object 200 of the function that is not usually used by the user or the like is selected, the user is assisted through a line-of-sight search. Specifically, the user's line-of-sight search is performed, and it is determined that the user has recognized the object 200, which has been visually recognized by the user on the screen selected and displayed on a tab or the like for a time period longer than the time period threshold value 310 and which has been selected at a higher frequency than the frequency threshold value 320, as not being a function searched for by the user. Such an object 200 is set to be excluded from the selection so as not to be selected by the user, and the document screen after the return from the changed screen is displayed by, for example, being grayed out for distinction, to thereby reduce the user's time and labor in making a search for the second time or later.

The line-of-sight selection assisting processing according to this embodiment is implemented mainly by the control unit 10 executing the program stored in the storage unit 19 by using the hardware resources in cooperation with each unit.

Figure 5:
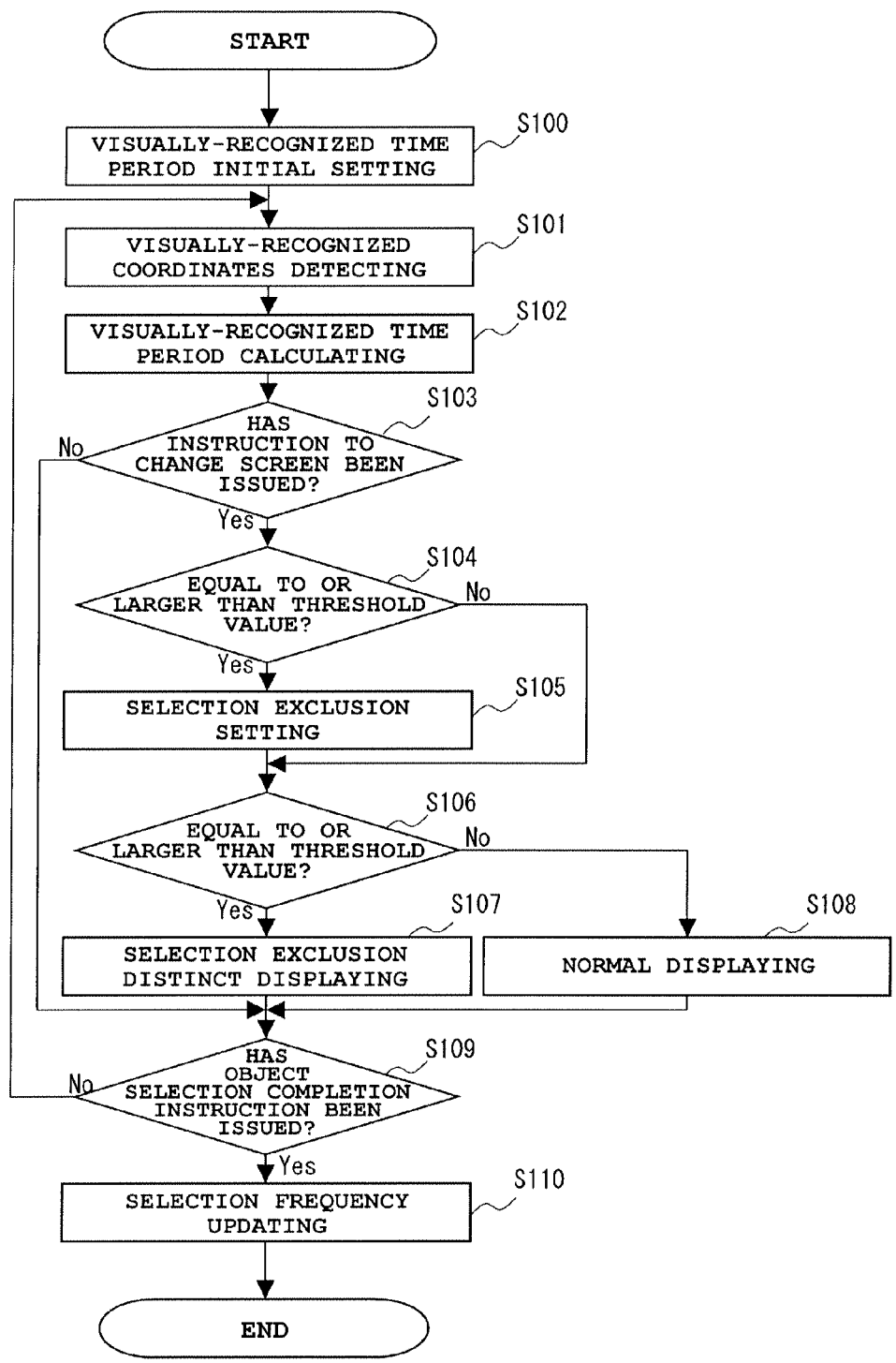
FIG. 5 illustrates steps of line-of-sight selection assisting processing according to the embodiment of the present disclosure.

Next, a step-by-step description is made of details of the line-of-sight selection assisting processing with reference to the flowchart of FIG. 5.

First, in Step S100, as the object visually-recognized time period calculation unit 110, the control unit 10 performs processing for initially setting the visually-recognized time period.

When the user uses the input unit 61 or the like to instruct to display a menu or the like for selecting the object 200 from a plurality of screens, the control unit 10 acquires the menu or the like. The control unit 10 identifies the screen selection information 300 corresponding to all the screens that can be selected from the menu or the like, and initializes the visually-recognized time period data 203 within the object 200 included therein.

Further, the control unit 10 selects the screen selection information 300 on an initial screen that is first displayed in the menu, and draws the object 200 included therein on the display unit 62 by the program of the GUI.

Figure 6A:
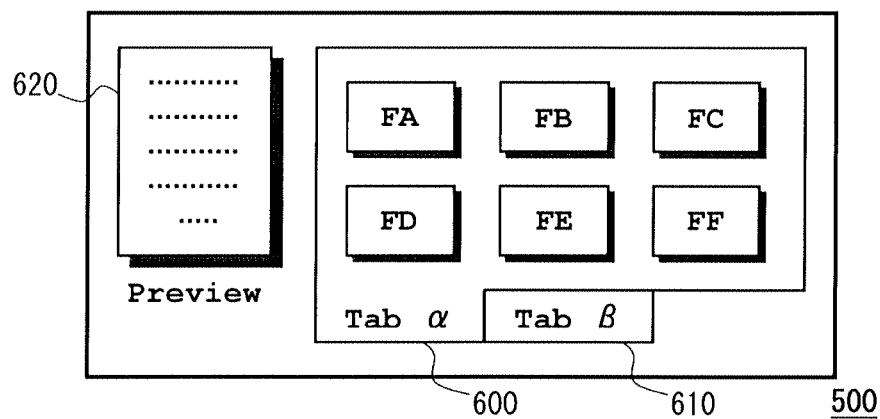
FIGS. 6A to 6C illustrate changes of a screen involved in the line-of-sight selection assisting processing illustrated in FIG. 5.

A screen example 500 of FIG. 6A illustrates an example in which the objects 200 of "FA" to "FF" are displayed on a display field 600 in which a screen of "Tab α" is displayed as the initial screen.

Further, the control unit 10 may authenticate the user, may activate the line-of-sight detection unit 20, and may perform other such kinds of initialization processing.

Subsequently, in Step S101, the line-of-sight detection unit 20 performs processing for detecting visually-recognized coordinates.

The line-of-sight detection unit 20 detects the user's line-of-sight as the visually-recognized coordinates 400. The visually-recognized coordinates 400 are stored so as to be readable by the control unit 10.

Subsequently, in Step S102, as the object visually-recognized time period calculation unit 110, the control unit 10 performs processing for calculating a visually-recognized time period.

The control unit 10 determines, based on the coordinate data 201, whether or not the visually-recognized coordinates 400 detected by the line-of-sight detection unit 20 fall within a given range of each object 200 included in the screen selection information 300 on the screen displayed on the display unit 62. In regard to the object 200 for which the visually-recognized coordinates 400 fall within the given range, the control unit 10 measures the time period of falling within the given range by the timer unit 18, adds the time period to the visually-recognized time period data 203 within the object 200, and stores the time period in the storage unit 19.

Subsequently, in Step S103, as the object visually-recognized time period calculation unit 110, the control unit 10 determines whether or not the user has issued an instruction to change the screen. If the user uses the input unit 61 to input the instruction to change the selection of the screen displayed on the display unit 62, the control unit 10 determines "Yes". Otherwise, that is, if the user is viewing the object 200 on the screen, or if the user selects the object 200, the control unit 10 determines "No".

Figure 6B:
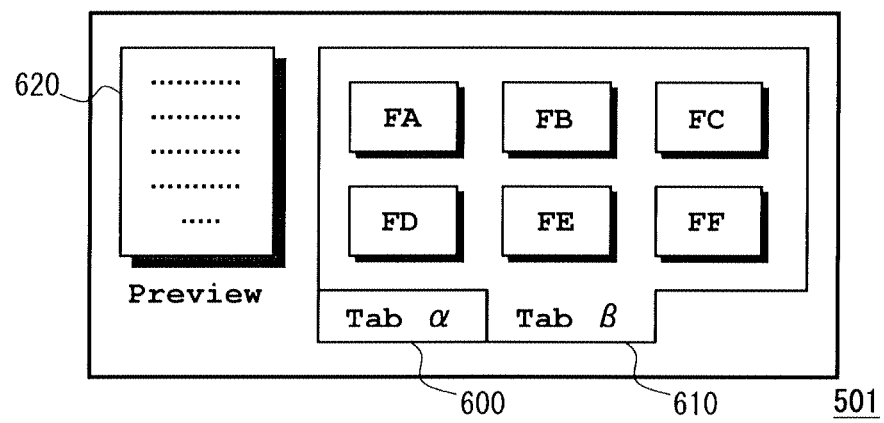
Figure 6C:
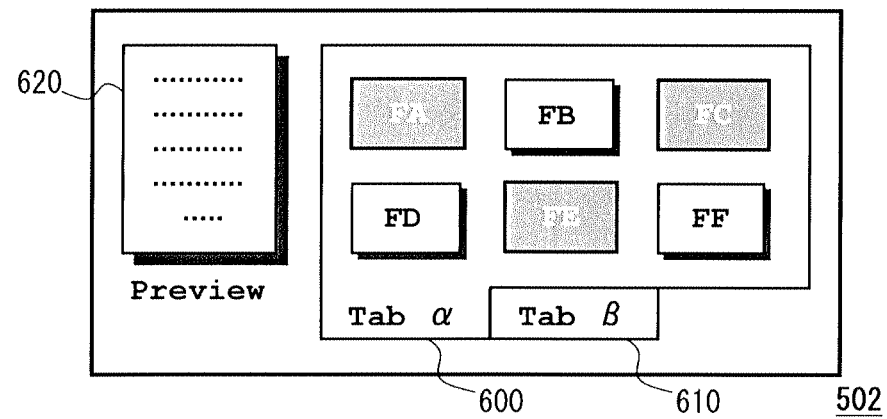

According to the screen examples 500-502 of FIGS. 6A to 6C, respectively, if a display field 610 in which the screen of "Tab β" is displayed is selected from the display field 600 in which the screen of "Tab α" is displayed, or if the display field 600 of "Tab α" is selected from the display field 610 of "Tab β", the control unit 10 determines "Yes" by assuming that the change in the screen display has been instructed. Specifically, for example, if a portion other than the respective objects 200 labeled "FA" to "FF" in the display field 600 or the display field 610 is pressed on the touch panel of the input unit 61, or if a button of "next", "back", or the like is pressed, the control unit 10 determines that the change in the screen display has been instructed.

If the determination is "Yes" in Step S103, the control unit 10 advances the processing to Step S104.

If the determination is "No" in Step S103, the control unit 10 advances the processing to Step S109.

In Step S104, if the screen is changed, as the selection exclusion unit 120, the control unit 10 determines whether or not the object 200 has a value of the visually-recognized time period data 203 equal to or larger than the time period threshold value 310 and has a value of the selection frequency data 202 equal to or larger than the frequency threshold value 320. The control unit 10 determines "Yes" for the object 200 having the value of the visually-recognized time period data 203 equal to or larger than the time period threshold value 310 and having the value of the selection frequency data 202 equal to or larger than the frequency threshold value 320 among the respective objects 200 included in the screen selection information 300 on the selected screen. The control unit 10 determines "No" for the other objects 200.

If the determination is "Yes" in Step S104, the control unit 10 advances the processing to Step S105.

If the determination is "No" in Step S104, the control unit 10 advances the processing to Step S106.

In Step S105, as the selection exclusion unit 120, the control unit 10 performs processing for setting selection exclusion for each object 200 having the value of the visually-recognized time period data 203 equal to or larger than the time period threshold value 310 and having the value of the visually-recognized time period data 203 equal to or larger than the frequency threshold value 320.

The control unit 10 sets the selection exclusion in the selection exclusion data 204 within the object 200 so as to be stored in the storage unit 19.

The screen example 500 of FIG. 6A illustrates an example in which the selection exclusion is set for the respective objects 200 of "FA", "FC", and "FE" within the display field 600. However, as described below, the changed screen is drawn immediately, and hence the selection exclusion is reflected later when the screen returns to the screen of the display field 600.

In Step S106, as the selection exclusion unit 120, the control unit 10 determines whether or not the screen display has been returned to the document screen display. The control unit 10 determines "Yes" if the screen selected by the user has already been displayed on the display unit 62. Otherwise, the control unit 10 determines "No".

In the screen example 501 of FIG. 6B, the control unit 10 determines "Yes" if the user instructs to display the display field 600 of "Tab α" while the display field 610 of "Tab β" is displayed.

If the determination is "Yes" in Step S106, the control unit 10 advances the processing to Step S107.

If the determination is "No" in Step S106, the control unit 10 advances the processing to Step S108.

In Step S107, when the screen display is returned to the document screen display, as the selection exclusion unit 120, the control unit 10 performs processing for distinctively displaying the selection exclusion.

The control unit 10 displays the object 200 whose selection exclusion is set in the selection exclusion data 204 on the display unit 62 distinctively from the object 200 whose selection exclusion is not set in the selection exclusion data 204. Therefore, when the screen selection information 300 is changed and then returned to the document screen selection information 300, the user can recognize the object 200 excluded from the selection distinctively from the other objects 200.

The display field 600 of the screen example 502 of FIG. 6C illustrates an example in which the respective objects 200 of "FA", "FC", and "FE" that are excluded from the selection are displayed distinctively by being grayed out. The control unit 10 may set each object 200 in the above-mentioned state so as not to be selected by the user. Further, in this example, in the display field 600, the objects 200 of "FB", "FD", and "FF" in the normal state, which are not excluded from the selection, are displayed without being grayed out.

After that, the control unit 10 advances the processing to Step S109.

Note that, the control unit 10 may control the object 200 in the grayed out state to be selected by being displayed in the normal state if the user presses the object 200 a plurality of times. In this case, the control unit 10 may again set the object 200 from the selection exclusion state of the selection exclusion data 204 to the normal state so as to be stored in the storage unit 19. Further, in this case, the control unit 10 may again set the time period threshold value 310 and the frequency threshold value 320.

In Step S108, if a different screen is displayed in the screen display, as the selection exclusion unit 120, the control unit 10 performs normal display processing.

The control unit 10 displays, on the display unit 62, the object 200 included in the screen selection information 300 corresponding to the screen selected by the user.

FIG. 6B illustrates an example in which the screen is displayed by being changed from the display field 600 of "Tab α" to the display field 610 of "Tab β". Note that, the control unit 10 can also display the object 200 that does not change as in a preview display field 620 even when the displayed screen is changed in the above-mentioned manner.

In Step S109, as the object selection frequency calculation unit 100, the control unit 10 determines whether or not the object selection completion instruction has been issued. If the user completes the selection by pressing the touch panel, the button, or the like of the input unit 61 for any one of the objects 200 displayed on the display unit 62, the control unit 10 acquires the object selection completion instruction, and determines "Yes". Otherwise, the control unit 10 determines "No".

If the determination is "Yes" in Step S109, the control unit 10 advances the processing to Step S110.

If the determination is "No" in Step S109, the control unit 10 returns the processing to Step S101, and causes the line-of-sight detection unit 20 to keep detecting the line of sight.

In Step S110, if acquiring the object selection completion instruction, as the object selection frequency calculation unit 100, the control unit 10 performs processing for updating the selection frequency.

The control unit 10 again calculates the frequency by adding thereto the selection frequency data 202 within the object 200 of the screen selection information 300 that has been selected, and stores the calculated frequency in the storage unit 19. Further, the control unit 10 reduces the frequency of the selection frequency data 202 within the object 200 that has not been selected over a specific period, and stores the reduced frequency in the storage unit 19.

After the above-mentioned steps, the line-of-sight selection assisting processing according to the embodiment of the present disclosure is brought to an end.

With the above-mentioned configuration, it is possible to obtain the following effects.

Previously, it may have been difficult for the user to search a large number of functions for a specific function even by using a typical line-of-sight search. Specifically, with a typical image forming apparatus, the user could easily select and use the function that is often used after remembering the function from the icon displayed on the screen of the operation panel unit. However, for the function that is rarely used, such work is necessary that the plurality of screens are switched over to imagine the function from the icon and a name of each function, select the icon in actuality, confirm the setting contents and the like, and then examine whether or not the function is what has been requested. Here, if the specific function is not found even after thorough examination, it is necessary to return the screen for review from the top again. In this case, a situation may occur in which the user does not remember which setting content of which icon has been examined and again examines the function that should have been examined already.

In contrast, the image forming apparatus 1 according to the embodiment of the present disclosure includes the display unit 62 that displays, on one screen, a plurality of objects 200 to be selected by the user, the line-of-sight detection unit 20 that detects the visually-recognized coordinates 400 on the display unit 62 to which the user's line-of-sight is directed, the object visually-recognized time period calculation unit 110 that calculates the time period during which the visually-recognized coordinates 400 detected by the line-of-sight detection unit 20 fall within the range of the object 200, and the selection exclusion unit 120 that excludes the object 200 from the candidates to be selected by the user if the time period calculated by the object visually-recognized time period calculation unit 110 is longer than the specific time period threshold value 310 and the frequency at which the object 200 is selected is higher than the specific frequency threshold value 320.

With this configuration, based on the line-of-sight search and the frequency at which the object 200 is selected so far, it is possible to exclude from selection targets the object 200 corresponding to the function or the like that has already been searched and determined by the user as being different. Therefore, the user is allowed to make a search smoothly by narrowing down the objects 200 to be searched. Accordingly, it is possible to improve the user's usability.

Further, the image forming apparatus 1 according to the embodiment of the present disclosure further includes the storage unit 19 that stores a plurality of pieces of screen selection information 300 indicating a combination of a plurality of objects 200 displayed on one screen, and in the image forming apparatus 1, the selection exclusion unit 120 displays, when the screen selection information 300 is changed and then returned to the document screen selection information 300, the object 200 excluded from the candidates to be selected by the user on the display unit 62 distinctively from the object 200 that is not excluded.

With this configuration, while the user is searching for a rarely-used function, it is possible to display the object 200 that has been determined as not being the function that is being searched for distinctively by displaying the object 200 so as to be grayed out or by erasing the object 200 from the screen display. Therefore, it is possible to reduce an amount of search made for the second time or later while allowing the user to pay attention to a state in which there is a function that is distinctively displayed. Accordingly, it is possible to prevent the user from wasting time and labor in making duplicative searches, and to allow the user to make a search effectively.

To summarize the above-mentioned effects, with the image forming apparatus 1 according to this embodiment, the user does not need to again examine the function that has already been examined once, which can improve the user's usability.

With reference to FIGS. 6A to 6C again, previously, to use the function of the typical image forming apparatus, the user needed to search all the functions to be used from the "FA" to "FF" of Tab α as in FIG. 6A, and if the function to be used was not found, the user needed to switch to Tab β as in FIG. 6B to keep searching the functions in the same manner as in the case of Tab α. Here, if the function to be used was not found, Tab β is returned to Tab α, and the search was made again in order from "FA".

In contrast, in the present embodiment, the object 200 that has already been searched and determined as not being the function requested by the user is excluded from the selection and displayed by, for example, being grayed out as in FIG. 6C. With such a configuration, when the user makes the second search for Tab α, the user needs to search only "FB", "FD", and "FF".

Therefore, the user does not need to perform an operation by paying close attention to which function is located in which position, and if determining that the function that has already been searched is different from what is requested, does not need to examine the function again. Accordingly, it is possible to improve the usability.

Note that, this embodiment is described by taking an example of using the line-of-sight detection to select the function. However, the line-of-sight function selection processing according to this embodiment can be applied not only to the above-mentioned example but also to all such processing as to select an image in the input unit 61. That is, for example, the control unit 10 can be used for processing for selecting a necessary object 200 from among a large number of objects 200 such as selection of a preview image or a thumbnail image or selection of a file.

With such a configuration, it is possible to improve the user's usability.

Further, this embodiment is described by taking an example of selecting the object 200 through the operation panel unit 16 of the image forming apparatus 1.

However, the present disclosure can also be applied to an information processing apparatus other than the image forming apparatus. For example, the present disclosure can also be applied to a smartphone, a mobile phone, a personal computer (PC), a personal data assistant (PDA), a television set, or the like that is provided with a touch panel.

Further, the configurations and operations of the above-mentioned embodiment are merely examples, and it should be understood that the above-mentioned embodiment can be executed by being appropriately modified within the scope that does not depart from the gist of the present disclosure.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device, comprising:
   a display unit that displays, on one screen, a plurality of objects to be selected by pressing by a user, the display unit being a touch panel;
   a line-of-sight detection unit that detects visually-recognized coordinates on the display unit to which the user's line-of-sight is directed;
   an object visually-recognized time period calculation unit that calculates a visually-recognized time period during which the visually-recognized coordinates detected by the line-of-sight detection unit fall within a range of the object;
   an object selection frequency calculation unit that calculates a selection frequency at which the object is selected by pressing by the user; and
   a selection exclusion unit that excludes the object from candidates to be selected by the user if the visually-recognized time period calculated by the object visually-recognized time period calculation unit is longer than a time period threshold value and the selection frequency calculated by the object selection frequency calculation unit is higher than a frequency threshold value.

2. The electronic device according to claim 1, further comprising a storage unit that stores a plurality of pieces of screen display information indicating a combination of the plurality of objects displayed on one screen,
   wherein the selection exclusion unit excludes the object from candidates to be selected by the user when the one screen that is displayed on the display unit is changed from a first screen based on first screen display information to a second screen based on second display information if the visually-recognized time period is longer than the time period threshold value and the selection frequency is higher than the frequency threshold value in the first screen, and
   wherein the selection exclusion unit sets, when the one screen that is displayed on the display unit is changed from the first screen to the second screen and then returned to the first screen, the excluded object so as not to be selected by the user.

3. The electronic device according to claim 2,
   wherein the selection exclusion unit displays, when the one screen that is displayed on the display unit is changed from the first screen to the second screen and then returned to the first screen, the excluded object on the display unit distinctively from the object that is not excluded.

4. The electronic device according to claim 3, wherein the selection exclusion unit displays, when the one screen that is displayed on the display unit is changed from the first screen to the second screen and then returned to the first screen, the excluded object, which is grayed out in the first screen, in a display manner different from a display manner of the object that is not excluded.

5. The electronic device according to claim 4, wherein the selection exclusion unit includes, when the excluded object is pressed a plurality of times by the user while the excluded object is displayed by being grayed out in the first screen, the excluded object into the candidates.

6. The electronic device according to claim 3, wherein the selection exclusion unit erases, when the one screen that is displayed on the display unit is changed from the first screen to the second screen and then returned to the first screen, the excluded object from the first screen.

7. The electronic device according to claim 2,
   wherein the object is an icon, and
   wherein the first screen and the second screen are selected by a first tab and a second tab, respectively.

8. An operation screen display method, comprising:
   displaying, via a display unit, on one screen, a plurality of objects to be selected by pressing by a user, the display unit being a touch panel;
   detecting, via a line-of-sight detection unit, visually-recognized coordinates on the display unit to which the user's line-of-sight is directed;
   calculating, via an object visually-recognized time period calculation unit, a visually-recognized time period during which the visually-recognized coordinates detected by the line-of-sight detection unit fall within a range of the object;
   calculating, via an object selection frequency calculation unit, a selection frequency at which the object is selected by pressing by the user;
   excluding, via a selection exclusion unit, the object from candidates to be selected by the user if the visually-recognized time period calculated by the object visually-recognized time period calculation unit is longer than a time period threshold value and the selection frequency calculated by the object selection frequency calculation unit is higher than a frequency threshold value.

9. The operation screen display method according to claim 8, further comprising:
   storing, in a storage unit, a plurality of pieces of screen display information indicating a combination of the plurality of objects displayed on one screen;
   excluding, via a selection exclusion unit, the object from candidates to be selected by the user when the one screen that is displayed on the display unit is changed from a first screen based on first screen display information to a second screen based on second display information if the visually-recognized time period is longer than the time period threshold value and the selection frequency is higher than the frequency threshold value in the first screen; and
   setting, via the selection exclusion unit, when the one screen that is displayed on the display unit is changed from the first screen to the second screen and then returned to the first screen, the excluded object so as not to be selected by the user.

10. The operation screen display method according to claim 9, further comprising:
    displaying, via the selection exclusion unit, when the one screen that is displayed on the display unit is changed from the first screen to the second screen and then returned to the first screen, the excluded object on the display unit distinctively from the object that is not excluded.

11. The operation screen display method according to claim 10, further comprising displaying, via the selection exclusion unit, when the one screen that is displayed on the display unit is changed from the first screen to the second screen and then returned to the first screen, the excluded object, which is grayed out in the first screen, in a display manner different from a display manner of the object that is not excluded.

12. The operation screen display method according to claim 11, further comprising, when the excluded object is pressed a plurality of times by the user while the excluded object is displayed by being grayed out in the first screen, the selection exclusion unit including the excluded object into the candidates.

13. The operation screen display method according to claim 10, further comprising erasing, via the selection exclusion unit, when the one screen that is displayed on the display unit is changed from the first screen to the second screen and then returned to the first screen, the excluded object from the first screen.

14. A non-transitory computer-readable recording medium having recorded thereon an operation screen display program executable by a computer, the operation screen display program comprising:
  a first program code that causes the computer to display, on one screen of a display unit, a plurality of objects to be selected by pressing by a user, the display unit being a touch panel;
  a second program code that causes the computer to detect visually-recognized coordinates on the display unit to which the user's line-of-sight is directed;
  a third program code that causes the computer to calculate a visually-recognized time period during which the visually-recognized coordinates detected by the second program code fall within a range of the object;
  a fourth program code that causes the computer to calculate a selection frequency at which the object is selected by pressing by the user; and
  a fifth program code that causes the computer to exclude the object from candidates to be selected by the user if the visually-recognized time period calculated by the third program code is longer than a time period threshold value and the selection frequency calculated by the fourth program code is higher than a frequency threshold value.

15. The non-transitory computer-readable recording medium according to claim 14, further comprising:
  sixth program code that causes the computer to store, in a storage unit, a plurality of pieces of screen display information indicating a combination of the plurality of objects displayed on one screen;
  a seventh program code that causes the computer to exclude the object from candidates to be selected by the user when the one screen that is displayed on the display unit is changed from a first screen based on first screen display information to a second screen based on second display information if the visually-recognized time period is longer than a time period threshold value and the selection frequency is higher than a frequency threshold value in the first screen, and
  an eighth program code that causes the computer to set, when the one screen that is displayed on the display unit is changed from the first screen to the second screen and then returned to the first screen, the excluded object so as not to be selected by the user.

16. The non-transitory computer-readable recording medium according to claim 15, further comprising:
  a ninth program code that causes the computer to display, when the one screen that is displayed on the display unit is changed from the first screen to the second screen and then returned to the first screen, the excluded object on the display unit distinctively from the object that is not excluded.

17. The non-transitory computer-readable recording medium according to claim 16, wherein the ninth program code causes the computer to display, when the one screen that is displayed on the display unit is changed from the first screen to the second screen and then returned to the first screen, the excluded object, which is grayed out in the first screen, in a display manner different from a display manner of the object that is not excluded.

18. The non-transitory computer-readable recording medium according to claim 17, further comprising a tenth program code that causes the computer to include, when the excluded object is pressed a plurality of times by the user while the excluded object is displayed by being grayed out in the first screen, the excluded object into the candidates.

19. The non-transitory computer-readable recording medium according to claim 16, wherein the ninth program code causes, when the one screen that is displayed on the display unit is changed from the first screen to the second screen and then returned to the first screen, the computer to erase the excluded object from the first screen.

* * * * *